S. F. VOSE.
DENTAL HOLDER AND MOUTH SPECULUM.
APPLICATION FILED DEC. 18, 1918.
1,331,542.
Patented Feb. 24, 1920.
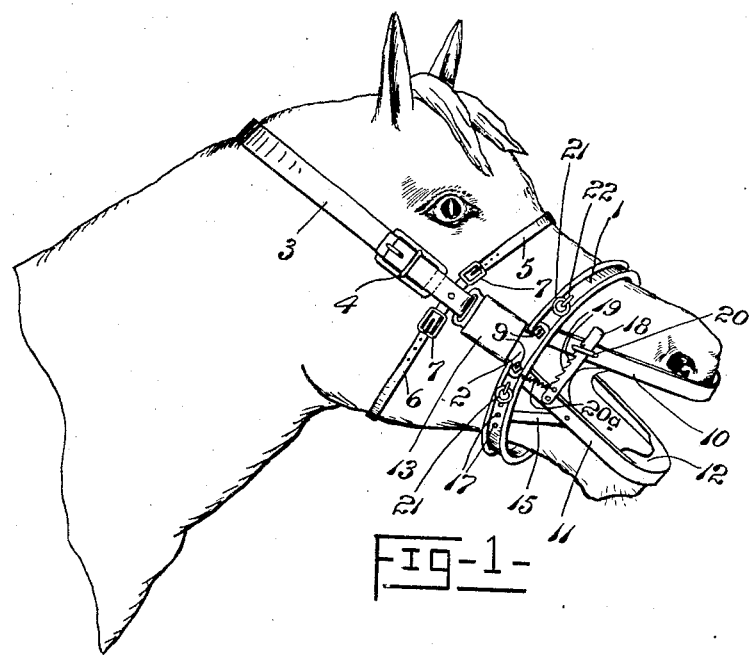
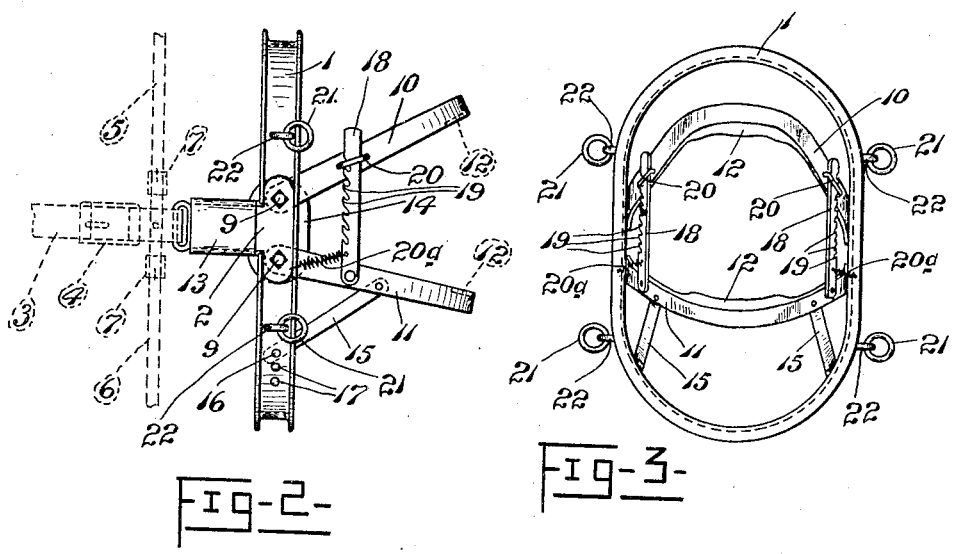
Inventor
Samuel F. Vose.
By Moulton & Limance
Attorneys S. F. VOSE.
DENTAL HOLDER AND MOUTH SPECULUM.
APPLICATION FILED DEC. 18, 1918.
1,331,542.
Patented Feb. 24, 1920.
2 SHEETS—SHEET 2.
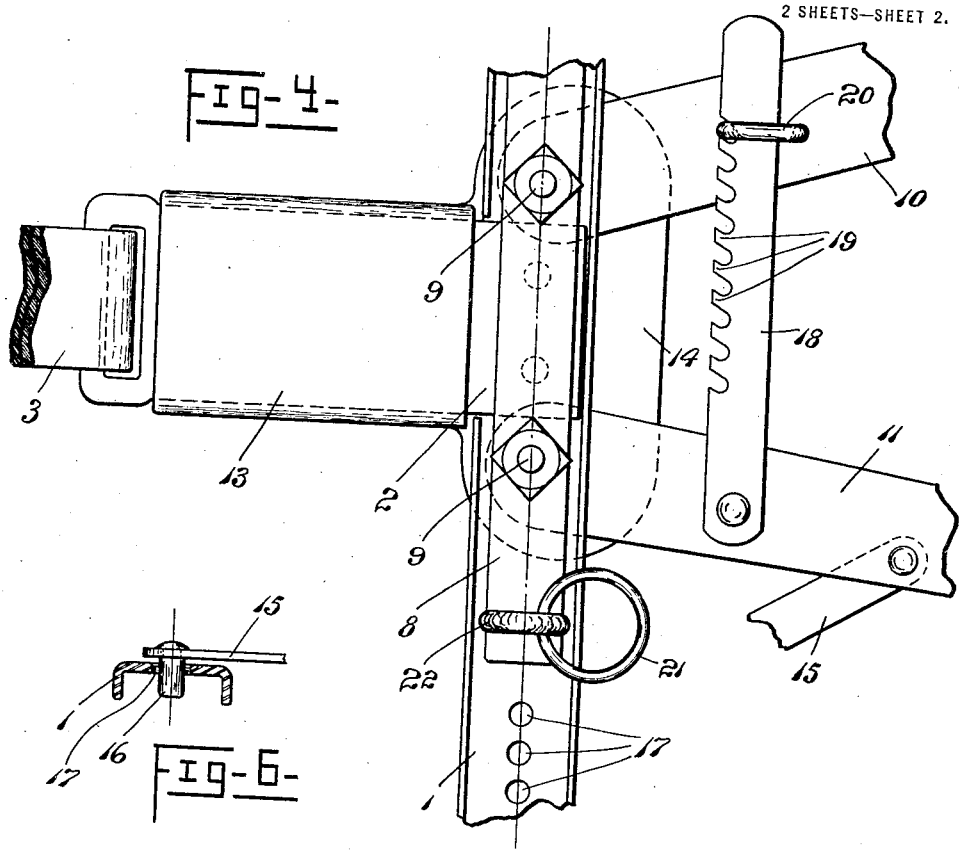
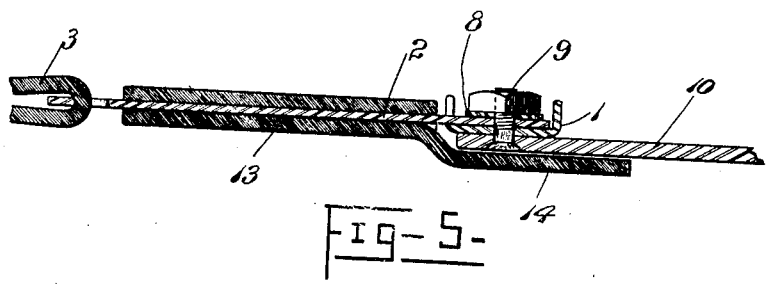
Inventor
Samuel F. Vose
By Moulton & Liveance
Attorneys

UNITED STATES PATENT OFFICE.

SAMUEL F. VOSE, OF SHAWNEE, OKLAHOMA, ASSIGNOR TO VETERINARY SPECIALTY COMPANY, OF HOLLAND, MICHIGAN, A CORPORATION OF MICHIGAN.

DENTAL HALTER AND MOUTH-SPECULUM.

1,331,542.  Specification of Letters Patent.  Patented Feb. 24, 1920.

Application filed December 18, 1918. Serial No. 267,365.

*To all whom it may concern:*

Be it known that I, SAMUEL F. VOSE, a citizen of the United States of America, residing at Shawnee, in the county of Pottawatomie and State of Oklahoma, have invented certain new and useful Improvements in Dental Halters and Mouth-Speculula; and I do hereby declare the following to be a full, clear, and exact description of the invention, such as will enable others skilled in the art to which it appertains to make and use the same.

This invention relates to a combined halter and mouth speculum particularly adapted to be applied to animals for use in drawing the head of the animal to a desired position and for holding the mouth of the animal open a greater or less extent. It is an object and purpose of the invention to provide a device of this character of simple construction, one that may be easily applied to the head and mouth of an animal and one in which the jaw engaging members thereof may be adjusted into various positions with respect to each other and also to the main supporting member of the device. These features of novelty as well as many others will appear more fully and in detail as the description progresses, reference being had to the accompanying drawings showing a practical and working embodiment of the invention, in which drawings, Figure 1 is a perspective view of the device, the same being shown applied to the head and mouth of a horse.

Fig. 2 is a side view of the main portion of the device, the securing straps being indicated in dotted outline.

Fig. 3 is a front elevation.

Fig. 4 is a fragmentary side elevation enlarged showing the connection of the jaw members to the main member of the device.

Fig. 5 is a horizontal section through the pivotal connection of a jaw member to said main member, and Fig. 6 is a section through a detail of the construction.

Like reference characters refer to like parts in the different views of the drawings.

In construction, a main member formed of channel iron is formed into a substantially elliptical ring 1, the same being of a size to pass freely over the nose and jaws of an animal such as a horse, and to the same at opposite sides, flat metal strips 2 are permanently secured, extending a short distance and having the ends of a strap 3 attached thereto. In the length of the strap 3 a buckle 4 is interposed whereby the strap may be passed over the neck of the animal and tightened as much as is necessary. Additional securing straps 5 and 6 with buckles 7 in their lengths are attached to the strap 3 as shown, being adapted to pass over the head and under the jaws of the animal and tightened so as to hold the ring securely against displacement.

In practice the ends of the strips 2 may be riveted or otherwise permanently connected to the sides of the main member 1 and the construction reinforced by strips 8 lying over and against said strips 2, bolts 9 passing through strips 8 and the sides of the member 1 and also through the ends of upper and lower jaw members 10 and 11 which are in the form, substantially, to fit the under and upper sides of the upper and lower jaws of an animal, respectively, extending in front of the main member 1 and pivotally connected thereto at their rear ends. Tooth engaging plates 12 are formed integral with the jaw members 10 and 11 and are adapted to come under and over the upper and lower front teeth of the animal when applied to the jaws of the same. The parts 2 are covered with a leather cover 13 which has an extension 14 to pass alongside and cover the pivotal connections of the jaw members to the main member 1, thus protecting the animal from injury which might otherwise occur.

A brace 15 is pivotally connected to the under jaw member 11 and extends downwardly and to the rear to the ring 1. It is provided with a pin 16 at its rear end which is adapted to enter any one of a plurality of holes 17 made through the side of the ring one over the other, thus permitting the angular adjustment of the lower jaw member with respect to the main supporting member to as many positions as there are holes 17. A bar 18 is also pivotally connected at its lower end at each side of the lower jaw member 11, being provided with a consecutive series of spaced apart teeth 19 at one edge. These bars pass through retaining stirrups 20 secured one at each side of the upper jaw member 10, it being evident that the upper jaw member may be turned to various positions and held therein, the notches between the teeth 19 receiving one leg of the stirrup members and holding the upper jaw member in any position to which it may be adjusted. Springs 20ª under tension are located between the bars 18 and the ring 1, the tendency of which is to draw the notched sides of the bars over against one of the legs of the retaining stirrups, making the operation of the bars automatic to hold the upper jaw member in any position to which it may be moved.

At each side of the ring 1 two rings 21 are loosely mounted in staples 22 permanently connected to the part 1. These rings 21 are spaced apart and are adapted to have ropes or the like secured thereto which may be secured in any upper position to hold the animal and draw its head upwardly for examination of its mouth or for treating it in any other manner. The halter and speculum when applied to the head of an animal, such as a horse, is firmly secured on the head against displacement, and with it the jaws of the animal may be opened to any desired position and head therein. The construction is relatively simple but is very durable and practical for the purposes set forth.

I claim:

1. In a device of the character described, a main supporting member adapted to pass around the front portion of the head of an animal, a lower jaw member pivotally connected and extending in front of the main member, means to adjust said lower jaw member to a plurality of different positions with respect to the main member, an upper jaw member pivotally connected to the main member, and means to adjust the upper jaw member to a plurality of different positions with respect to the lower jaw member.

2. In a device of the character described, a ring, jaw members connected to opposite sides of the ring and located one over the other, means to hold the lower jaw member in rigid relation to the ring, and means to adjust the upper jaw member to a plurality of different positions with respect to the ring and lower jaw member, substantially as described.

3. In a device of the character described, a ring, upper and lower jaw members connected to and extending from said ring, means to hold the lower jaw member in rigid relation to the ring, a bar having a plurality of notches at one edge thereof pivotally connected to the lower jaw member and extending in an upward direction, and a retaining stirrup on the upper jaw member through which the bar passes, said notches being adapted to receive one leg of the stirrup, substantially as described.

4. In a device of the character described, a ring adapted to pass around the front portion of the head of an animal, said ring having a plurality of openings one over the other in one side thereof, a lower jaw member pivotally connected to the ring and extending in front thereof, a brace pivotally connected to the lower jaw member and extending downwardly and to the rear to the ring, a pin on the lower end of the brace adapted to enter any one of the openings in the ring, an upper jaw member pivotally connected to and extending in front of the ring, and means to adjust the upper jaw member to a plurality of different positions with respect to the lower jaw member.

5. In a device of the character described, a ring adapted to pass around the front portion of the head of an animal, said ring having a plurality of openings one over the other in a side thereof, a lower jaw member connected to the ring and extending in front thereof, a brace pivotally mounted at its upper end on the lower jaw member and extending toward the ring, a pin on the lower end of the brace adapted to enter any one of said openings in the ring, an upper jaw member pivotally connected to and extending in front of the ring, a bar having a plurality of notches in one edge pivotally connected at its lower end to each side of the lower jaw member, a stirrup on each side of the upper jaw member through which said notched bars pass, and means to draw said bars toward a leg of said stirrups, substantially as described.

In testimony whereof I affix my signature.

SAMUEL F. VOSE.